Patented Nov. 13, 1951

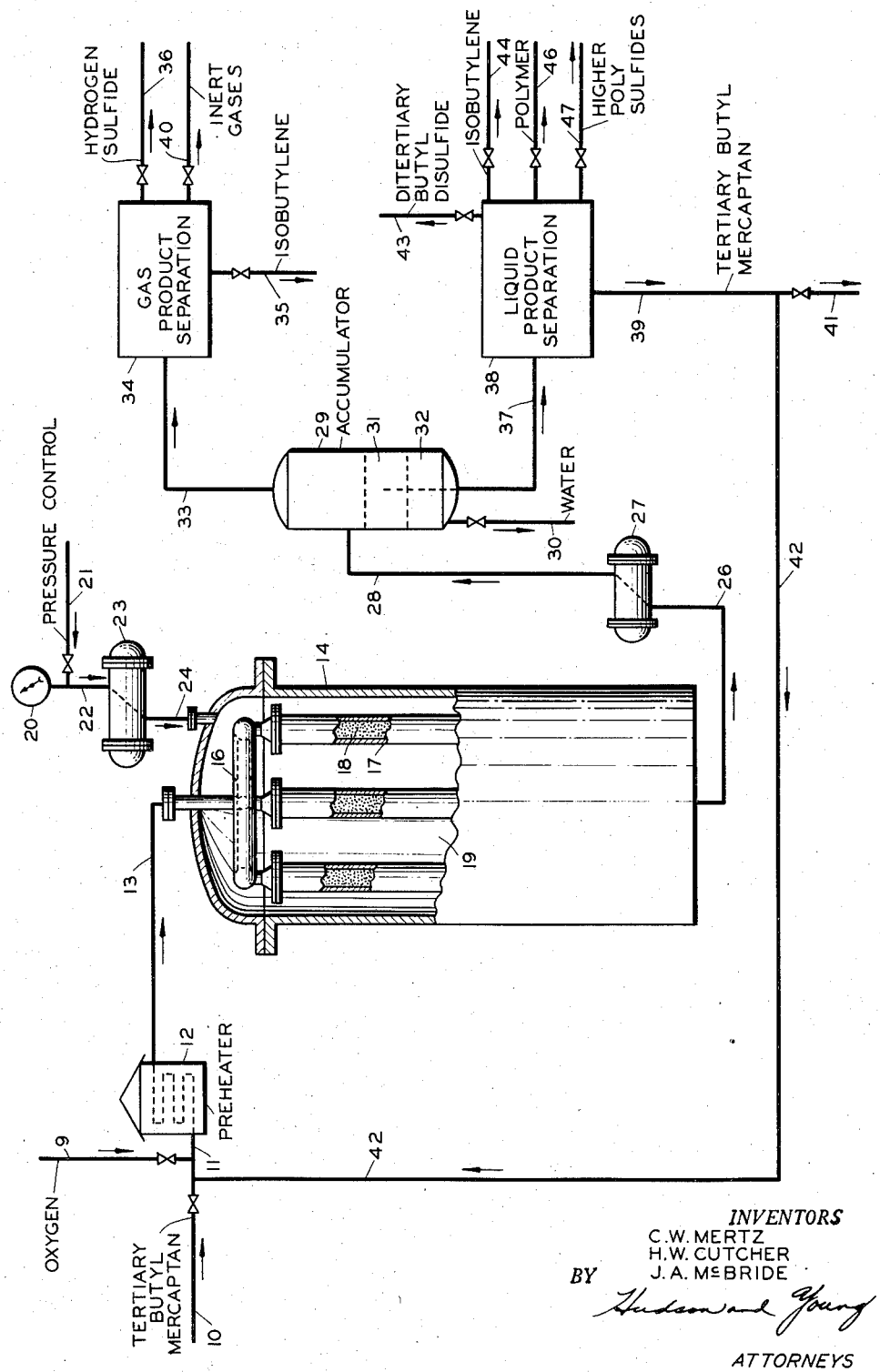

2,574,884

UNITED STATES PATENT OFFICE 2,574,884

OXIDATION OF MERCAPTANS

Clyde W. Mertz and Haskell W. Cutcher, Borger, and John A. McBride, Phillips, Tex., assignors to Phillips Petroleum Company, a corporation of Delaware Application April 28, 1949, Serial No. 90,221

10 Claims. (Cl. 260—608)

This invention relates to the manufacture of organic sulfides. In one aspect this invention relates to the oxidation of mercaptans. In another aspect this invention relates to the oxidation of tertiary mercaptans, to the corresponding sulfides.

The oxidation of mercaptans in gasoline to disulfides has long been practiced in the petroleum industry as a means of improving the quality of the product, and is often referred to as "sweetening." Two well-known sweetening processes are the "doctor" treatment and the "copper-sweetening" method. However, mercaptan oxidation methods of the kind employed for gasoline sweetening provide for oxidation of mercaptans present in low concentrations in the gasoline, as for example 0.01 to 0.03 per cent, and are not suitable for the commercial production of disulfides by mercaptan oxidation, in a practical manner. Also, the disulfides produced are not readily recovered in a suitable form.

This invention is concerned with the oxidation of alkyl mercaptans of any desired mercaptan purity to produce the corresponding alkyl sulfide, particularly the disulfide.

An object of this invention is to provide a process for the production of an organic sulfide.

Another object is to provide for the oxidation of a mercaptan to a corresponding sulfide.

Another object is to provide novel catalysts for the oxidation of a mercaptan to a corresponding sulfide.

Another object is to provide for the oxidation of a tertiary mercaptan present in a tertiary mercaptan-containing stock, in any desired concentration, to a corresponding sulfide.

Another object is to provide for the catalytic oxidation of tertiary-alkyl mercaptans containing not more than 6 carbon atoms per molecule to produce a corresponding sulfide.

Still another object is to provide for the catalytic oxidation of a tertiary-alkyl mercaptan containing not more than 6 carbon atoms in the molecule, to the corresponding tertiary-alkyl disulfide.

It is yet another object to provide for the catalytic oxidation of tertiary-butyl mercaptan to di-tertiary-butyl disulfide.

Other objects will be apparent, to one skilled in the art, from the accompanying discussion and disclosure.

In accordance with one embodiment of this invention a tertiary-alkyl mercaptan, preferably containing not more than 6 carbon atoms in the molecule, is oxidized with free oxygen of any desired oxygen purity, to a corresponding sulfide, particularly the disulfide, in the presence of novel oxidation catalysts. Tertiary-alkyl mercaptans may be oxidized in any desired concentration in accordance with our invention. We have found that among several novel catalysts that may be utilized in the process of our invention, certain alumina-base catalysts particularly chromia, vanadia, and magnetic iron oxide each associated with alumina in a major proportion, are particularly suitable. We have found that the oxidation step of our invention may be conducted in the presence of our catalysts over a temperature range of 150 to 450° F., although more preferably, we employ a temperature within the limits of 275 to 350° F. A pressure of from one atmosphere to as high as from 800 to 1000 p. s. i. g. or higher, if desired, may be advantageously employed, although subatmospheric pressure may be utilized. In carrying out the process of our invention, we prefer usually to admit oxygen into the catalyst zone in a mole ratio to mercaptan, preferably within the limits of 0.06:1 to 0.25:1, and to introduce the mercaptan into the catalyst zone at a space velocity within the range of 0.25 to 1.0 volume per catalyst volume per hour, based on liquid volumes of mercaptan in the mercaptan-containing stock. We can oxidize mercaptans in accordance with our invention, either in the liquid or vapor phase, but the reaction in preferably carried out in vapor phase.

We have found in many instances of operation that a threshold temperature exists above which an unduly large amount of mercaptan decomposition occurs, producing hydrogen sulfide and the corresponding olefin, together with some polymer. It is therefore usually advantageous to control the reaction temperature to prevent development of temperatures above such a threshold value. In many instances the threshold temperature of oxidation and decomposition are quite close, and consequently close control of the temperature is desirable. At the lower conversion levels the need for close temperature control is of course considerably lessened, since a smaller quantity of exothermic heat of reaction is liberated.

Our invention is especially well applied to the oxidation of alkyl mercaptans containing preferably not more than 6 carbon atoms; our invention is perhaps most advantageously applied to the oxidation of tertiary-alkyl mercaptans, which are potentially more resistant to direct oxidation to a disulfide than are primary or secondary mercaptans.

In the following description one method of operating our process will be specifically disclosed. The figure is a diagrammatic illustration of one form of apparatus in which our process may be practiced. It is to be understood that the flow diagram is diagrammatic only and may be altered in many respects, by those skilled in the art, and yet remain within the intended scope of our invention.

Referring to the figure, tertiary-butyl mercaptan of about 90 to 95 per cent mercaptan purity from line 10, is passed into line 11 and admixed therein with commercial grade free oxygen, i. e., 90 to 95 percent oxygen purity, from line 9, in a mole ratio of oxygen to tertiary-butyl mercaptan within the limits of 0.06:1 to 0.25:1. The resulting marcaptan-oxygen admixture is passed from line 11 into preheater 12 and heated to about 275° F. and vaporized. Preheated mercaptan-oxygen mixture from zone 12 is passed through line 13 into header 16 in reaction chamber 14. Chamber 14 comprises an arrangement of apparatus for conducting the catalytic oxidation reaction of this invention in a manner to efficiently remove exothermic heat of reaction so as to prevent the development of unduly high reaction temperatures and "hot spots." In a preferred arrangement as illustrated in the figure, vaporous charge from line 13 is passed into a header 16, connected to and in communication with a plurality of catalyst tubes 17 packed with a novel catalyst of this invention such as vanadia on alumina or magnetic iron oxide mixed with bauxite, 18. Liquid heat transfer medium 19, preferably water, is maintained at a boiling temperature in direct contact in chamber 14 with catalyst tubes 17. Reaction temperature in catalyst tubes 17 is regulated by a choice of boiling temperature of heat transfer medium 19, which in turn is controlled by the pressure imposed on the boiling heat transfer liquid. Heat is supplied to liquid 19 by any well-known heating means such as internal steam coil, an externally electrically heated coil, an internal "immersion type" electric heater, a thermosiphon-arm, or the like not shown. Boiling pressure of liquid 19 may be maintained by an inert gas such as air or nitrogen from line 21 communicating with the boiling liquid through line 22, condenser 23, and line 24, at any predetermined inert gas pressure, measured by gauge 20. Condenser 23, usually a water-cooled condenser, cools and condenses vapors liberated from the boiling liquid 19 and is disposed so as to cause condensate thus formed to flow back into chamber 14. Operating in this manner, a boiling temperature over a wide range may be selected, and catalyst tubes 17 may be uniformly heated, while maintaining a high ratio of heat transfer surface to catalyst volume in chamber 14 and preventing uneven removal of exothermic reaction heat from tubes 17.

Vaporous mercaptan-oxygen mixture from header 16 is passed through catalyst tubes 17 at a space velocity of from 0.25 to 1.0 volume per catalyst volume per hour, based on liquid volume of mercaptan. Tertiary-butyl mercaptan is catalytically oxidized to di-tertiary-butyl disulfide as a chief oxidation product in catalyst tubes 17 at a temperature in the preferred range of 275 to 350° F., together with relatively small quantities of di-tertiary-butyl trisulfide and higher molecular weight sulfides. Effluent from the catalyst tubes in chamber 14 is passed through line 26, condenser 27 and line 28 into accumulator 29. Condensate formed in condenser 27 comprises a liquid product phase and a water by-product phase and is collected in accumulator 29 as product layer 31 and water layer 32. Uncondensed gas from line 28 is collected in the upper portion of accumulator 29. This uncondensed gas consists primarily of hydrogen sulfide together with any inert diluent such as nitrogen, occurring in the oxygen from line 9, and some isobutylene. Uncondensed gas is passed from zone 29 through line 33 into gas product separation means 34 comprising equipment suitable for separating and recovering hydrogen sulfide and other gases in the gas admitted from line 33, such as condensers, coolers, distillation equipment, solvent extraction equipment and the like, well known to those skilled in the art, not individually illustrated herein. From zone 34, hydrogen sulfide is withdrawn through line 36, isobutylene is withdrawn through line 35, and other inert gases are withdrawn through line 40.

Water phase 32 is withdrawn from accumulator 29 through line 30. Liquid product phase 31 in zone 29 comprises di-tertiary-butyl disulfide with small amounts of di-tertiary-butyl trisulfide, and higher molecular weight sulfides, together with unreacted tertiary-butyl mercaptan and small amounts of isobutylene polymer and any dissolved isobutylene. This liquid product is passed from accumulator 29 through line 37 to liquid product separation and recovery means 38 comprising distillation equipment, condensers, coolers, and the like, not individually illustrated, which are well known to those skilled in the art, and which are suitable for separation and recovery of the individual components in the liquid from line 37. Unreacted tertiary-butyl mercaptan is withdrawn from zone 38 through lines 39 and 41, or recycled from line 39 through line 42 to line 10, for reaction in zone 14. Di-tertiary-butyl disulfide is withdrawn from zone 38 through line 43 as a product of the process. Isobutylene and isobutylene polymer are withdrawn respectively through lines 44 and 46. Higher molecular weight-tertiary-butyl sulfides are withdrawn through line 47.

Our preferred catalysts are those catalysts described hereinbefore comprising alumina in a major proportion associated with an oxide selected from the group consisting of vanadia, magnetic iron oxide, and chromia. Concentrations of vanadia in the vanadia-alumina catalyst, and chromia in the chromia-alumina catalyst, as high as 30 per cent by weight of the finished catalyst may be advantageously employed. Similarly, magnetic iron oxide is associated with an alumina base, in concentrations up to as high as about 30 per cent by weight, based on the finished catalyst. Generally, however, we prefer that the catalyst contain from 1 to 20 per cent of the metal oxide associated with alumina, based on finished catalyst, an optimum concentration often being within the range from 5 to 15 per cent by weight.

Our vanadia-alumina and chromia-alumina catalysts may be prepared in accordance with conventional dipping procedures. In the preparation of the former, activated alumina may be dipped in aluminum vanadate solution, and drained, dried, and calcined to produce the finished vanadia-on-alumina catalyst, and in the preparation of the latter, activated alumina may be dipped in chromium trioxide solution, and drained, dried and calcined to produce the finished catalyst.

We may employ our magnetic iron-oxide-alumina catalyst in various forms. We have found, however, that magnetic iron oxide in simple mechanical mixture with an alumina comprising a bauxite is a particularly active catalyst for the oxidation step of our invention.

Vanadia, in the calcined vanadia-alumina catalyst of our invention, is generally $V_2O_5$, although in some case, $V_2O_3$ may be present. Chromia, in the calcined chromia-alumina catalyst of our invention, is generally a mixture of $Cr_2O_3$ and $CrO_3$, although one or the other may be present alone.

Operating our process in the manner above illustrated, yields of di-tertiary-butyl disulfide within the range of 5 to 30 per cent per pass and higher may be obtained, based on the mercaptan charged, while effecting a mercaptan conversion often within the range of 30 to 50 per cent.

For convenience and clarity certain apparatus such as pumps, surge tanks, accumulators, valves, etc., have not been shown in the drawing. Obviously such modifications of the present invention may be practiced without departing from the scope of the invention.

When utilizing catalysts of our invention, regardless of whether or not the preferred embodiment of our process is employed, significant yields of alkyl sulfide product are obtained in any case, but we have found that we obtain higher total yields of sulfide, and particularly the disulfide, when we prevent the development of unduly high and uneven reaction temperatures.

Our invention is illustrated by the following examples. The reactants, their proportions, and other specific ingredients are presented as being typical, and should not be construed to limit the invention unduly.

*Example 1*

A number of runs were conducted in the investigation of the catalyst activity of various materials on the oxidation of tertiary-butyl mercaptan with commercial grade oxygen. These oxidations were carried out in a steel reaction tube containing 100 ml. of catalyst. The mercaptan reactant was preheated and passed in vapor phase downwardly through the catalyst bed at a space velocity, based on liquid mercaptan, of 1.0 volume/catalyst volume/hour, together with air added downstream from the preheater. Reactor effluent was passed through a water condenser and the effluent was condensed and the uncondensed gases were vented. The catalyst tube and preheater tube were each electrically heated. The conversion of tertiary-butyl mercaptan to total sulfide product, i. e., including di-tertiary-butyl disulfide, di-tertiary-butyl trisulfide and higher molecular weight sulfides, was determined by stripping the mercaptan from the condensed liquid product.

Pertinent catalyst data relating to these experimental runs are summarized in the following tabulation.

| Run No. | Catalyst | Temperature Range | Per Cent Conversion to Total Sulfide Product, Based on Mercaptan Charged |
|---|---|---|---|
| | | ° F. | |
| 1 | Vanadia-on-alumina | 200–215 | 16.9 |
| 2 | Magnetic Iron Oxide Associated with Bauxite.[1] | 200–250 | 21.8 |
| 3 | Chromia-alumina | 250–300 | 15.1 |
| 4 | Ferric Oxide [2] | 200–250 | [3] 4.6 |

[1] Twenty weight per cent black iron oxide mixed with a low iron content bauxite. The bauxite is the same as that of Example 2.
[2] Ninety-three per cent $Fe_2O_3$, 5 per cent $Cr_2O_3$, 2 per cent KOH.
[3] Predominantly liquid polymer formed by polymerization of olefin decomposition product. The reaction was primarily a decomposition.

Although automatic temperature control means was employed, the temperature rose on several occasions, in uncontrollable fashion.

*Example 2*

Tertiary-butyl mercaptan feed stock was preheated together with air and the preheated admixture was passed into an electrically heated gas reaction tube containing about 120 ml. of bauxite as a catalyst. The bauxite had the following approximate composition: $Al_2O_3$ 78 per cent, $Fe_2O_3$ 3 per cent, $SiO_2$ 14 per cent, and $TiO_2$ 5 per cent. The reaction was conducted at a temperature in the range of 180 to 250° F. Total effluent from the catalyst zone was passed through a water cooled condenser and partially condensed. Extensive mercaptan conversion took place. However, the liquid condensate product was comprised predominantly of olefins produced by mercaptan decomposition, and polymer formed from the olefin decomposition product. No oxidation of mercaptan to sulfide product was observed.

As will be evident, to those skilled in the art, various modifications of this invention can be made, or followed, in the light of the foregoing disclosure and discussion, without departing from the spirit or scope of the disclosure or from the scope of the claims.

We claim:

1. A process for the manufacture of a di-tertiary alkyl sulfide from a tertiary alkyl mercaptan containing not more than 6 carbon atoms per molecule, comprising reacting such a mercaptan with oxygen in the presence of a catalyst comprising alumina in a major proportion associated with an oxide selected from the group consisting of vanadia, magnetic iron oxide, and chromia, at a temperature in the range of 150 to 450° F., and recovering a di-tertiary alkyl sulfide from the resulting reaction product.

2. A process for the manufacture of a di-tertiary alkyl sulfide from a tertiary alkyl mercaptan containing not more than 6 carbon atoms per molecule, comprising reacting such a mercaptan with oxygen in the presence of a catalyst comprising alumina in a major proportion associated with an oxide selected from the group consisting of vanadia, magnetic iron oxide, and chromia, in a concentration of from 1 to 30 per cent by weight based on the finished catalyst at a temperature in the range of 275 to 350° F., and recovering a di-tertiary alkyl sulfide from the resulting reaction product.

3. A continuous process for the manufacture of a di-tertiary alkyl sulfide from a tertiary alkyl mercaptan containing not more than 6 carbon atoms per molecule, comprising introducing such a tertiary alkyl mercaptan into a catalyst zone together with an oxygen-containing gas in a mole ratio of oxygen to said mercaptan within the limits of 0.06:1 to 0.25:1, in contact with a catalyst comprising alumina in a major proportion associated with an oxide selected from the group consisting of vanadia, magnetic iron oxide, and chromia, in a concentration of from 1 to 20 per cent by weight of the finished catalyst, at a space velocity within the limits of 0.25 and 1.0 based on liquid volumes mercaptan per volume of catalyst per hour, and in said catalyst zone reacting said mercaptan with said oxygen in the vapor phase at a temperature within the range of 275 to 350° F.; and recovering a di-tertiary alkyl sulfide from the resulting reaction mixture as a product of the process.

4. The process of claim 3 wherein said catalyst is vanadia-on-alumina.

5. The process of claim 3 wherein said catalyst is chromia-on-alumina.

6. The process of claim 3 wherein said catalyst is magnetic iron oxide in admixture with a bauxite.

7. The process of claim 3 wherein said mercaptan is tertiary-butyl mercaptan and said di-tertiary alkyl sulfide is di-tertiary-butyl disulfide.

8. A continuous process for the manufacture of di-tertiary-butyl disulfide comprising introducing tertiary-butyl mercaptan in admixture with oxygen of at least 90 per cent oxygen purity in a mole ratio of oxygen to mercaptan within the limits of 0.06:1 to 0.25:1 into a preheating zone and therein heating said admixture to a temperature within the limits of 275 to 350° F. and vaporizing same, passing vaporous preheated mercaptan-oxygen mixture from said preheater into a reaction zone containing a granular catalyst comprising vanadia supported on alumina, in a concentration within the range of from 5 to 15 per cent by weight of the total catalyst at a space velocity within the range of from 0.25 to 1.0 based on liquid volumes of mercaptan per catalyst volume per hour, said reaction zone containing said catalyst disposed in a plurality of columns, maintaining said catalyst in indirect heat exchange relation with a liquid heat transfer medium boiling at a temperature to maintain the temperature of said mercaptan-oxygen reactants at a level not lower than 275° F. and not higher than 350° F., passing total effluent from said catalyst zone and partially condensing same, passing resulting condensate into a product separation means and therein separating unreacted mercaptan from said condensate, separating di-tertiary-butyl disulfide from said condensate, and recovering said di-tertiary-butyl disulfide as a product of the process.

9. The process of claim 8 wherein unreacted mercaptan separated in said separating means is recycled to said preheating zone.

10. A process for the manufacture of a di-tertiary alkyl disulfide from a tertiary alkyl mercaptan containing not more than 6 carbon atoms in the molecule, comprising contacting such a mercaptan with free oxygen in the presence of a catalyst comprising bauxite in a major proportion associated with magnetic iron oxide, at a temperature within the limits of 150 to 450° F., and recovering a di-tertiary alkyl disulfide as a resulting product of the process.

CLYDE W. MERTZ.
HASKELL W. CUTCHER.
JOHN A. McBRIDE.

REFERENCES CITED

The following references are of record in the file of this patent:

UNITED STATES PATENTS

| Number | Name | Date |
|---|---|---|
| 2,001,715 | Fisher | May 21, 1935 |
| 2,028,303 | Turner | Jan. 21, 1936 |
| 2,085,527 | Gregory | June 29, 1937 |
| 2,319,738 | Jones | May 18, 1943 |
| 2,421,545 | Crouch | June 3, 1947 |